US006638616B2

(12) United States Patent
Tortorello et al.

(10) Patent No.: US 6,638,616 B2
(45) Date of Patent: Oct. 28, 2003

(54) RADIATION-CURABLE COMPOSITIONS COMPRISING OLIGOMERS HAVING AN ALKYD BACKBONE

(75) Inventors: Anthony J. Tortorello, Elmhurst, IL (US); Eva Montgomery, Woodstock, IL (US); Chander P. Chawla, Batavia, IL (US)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/419,113

(22) Filed: Oct. 15, 1999

(65) Prior Publication Data

US 2002/0151615 A1 Oct. 17, 2002

(51) Int. Cl.⁷ .................. C08G 18/42; C08G 18/81; C03C 25/26
(52) U.S. Cl. ................ 428/378; 522/96; 522/98; 522/173; 528/65; 528/66
(58) Field of Search .................. 522/90, 98, 96, 522/173, 174, 179; 428/378; 385/114, 141, 145, 144; 528/65, 66

(56) References Cited

U.S. PATENT DOCUMENTS

| 3,664,861 | A |   | 5/1972  | Okamura et al.  |
| 3,713,864 | A |   | 1/1973  | Ackerman et al. |
| 4,204,010 | A | * | 5/1980  | Kramm et al.    |
| 4,273,690 | A | * | 6/1981  | Walus           |
| 4,608,409 | A | * | 8/1986  | Coady et al.    |
| 4,609,718 | A | * | 9/1986  | Bishop et al.   |
| 4,629,287 | A | * | 12/1986 | Bishop          |
| 4,690,501 | A | * | 9/1987  | Zimmerman et al.|
| 4,798,852 | A | * | 1/1989  | Zimmerman et al.|
| 4,806,574 | A | * | 2/1989  | Krajewski et al.|
| 4,822,829 | A |   | 4/1989  | Muller et al.   |
| 5,380,108 | A |   | 1/1995  | Fukahori et al. |
| 6,085,010 | A | * | 7/2000  | Zahora et al.   |
| 6,240,230 | B1| * | 5/2001  | Szum            |

FOREIGN PATENT DOCUMENTS

| EP | 0 539 030 A1 | * | 4/1993 |
| EP | 0924274 A2   |   | 6/1999 |

OTHER PUBLICATIONS

Clive H. Hare, "Protective Coatings", year 1994, pp. 137–148 (Technology Publishing Company, Pittsburgh, PA; ISBN: 0–938477–90–0).

* cited by examiner

Primary Examiner—Susan W. Berman
(74) Attorney, Agent, or Firm—Pillsbury Winthrop LLP

(57) ABSTRACT

The present invention relates to a radiation-curable solvent-free coating composition for optical fiber having a radiation-curable urethane (meth)acrylate oligomer comprising an alkyd backbone, a reactive diluent, a photoinitiator and, optionally, an additive.

35 Claims, No Drawings

RADIATION-CURABLE COMPOSITIONS COMPRISING OLIGOMERS HAVING AN ALKYD BACKBONE

The present invention relates to a radiation-curable coating composition for optical fiber, to an alkyd urethane (meth)acrylate oligomer, and to a coated substrate.

BACKGROUND OF THE INVENTION

Glass optical fibers are widely used in the communications field because of their ability to carry large amounts of information over long distances. In order to protect the fibers from physical damage and from deterioration due to environmental agents such as water, it is conventional to apply at least one protective coating immediately after spinning the molten glass. Generally, two coatings are applied, a soft primary coating of low modulus and low glass transition temperature (Tg) directly on the glass surface, and a harder (higher Tg), higher modulus secondary coating, on the primary coating. The individual fibers generally are combined in larger structures such as cables. Cables may comprise individual fibers, or fiber ribbon structures. The optical fiber ribbon generally is made from 2, 4, 6, 8 or 12 optical fibers, in general arranged in a plane, and bonded together with a so-called matrix material. Several ribbons can be bundled together using bundling materials. Further, individual fibers often are provided with a coloring or ink layer to be able to identify individual fibers.

Resins that cure on exposure to radiation such as ultraviolet radiation are favored in the industry, due to their fast cure, enabling the coated fiber to be produced at high speed. In many of these radiation curable resin compositions, use is made of urethane oligomers having reactive termini (such as f.i. an acrylate or methacrylate functionality) and a polymer backbone, which compositions generally further comprise reactive diluents, photoinitiators to render the compositions radiation-curable, and suitable additives.

There are several properties which are commonly required for all the different coatings. Some of these requirements are low water absorption, low extractables, maintenance of the desirable levels of properties such as modulus, elongation, Tg, and adhesion under aggresive aging conditions (over relatively long periods of time) including high temperatures and/or high humidities, immersion in water and chemical resistance.

As mentioned above, urethane acrylate oligomers are well-known for use in radiation curable coating compositions for optical fibers. As polymer backbone for the urethane oligomer, many materials have been used, such as polyether backbones. Urethane acrylate oligomers are derived from reactants including a hydroxy-functional prepolymer (polyol), an organic diisocyanate and an ethylenically unsaturated monomer containing one or more hydroxyl groups. Polyols that often have been used are f.i. hydrocarbon polyols, polyether polyols such as poly(ethylene)glycol, poly(propylene)glycol and poly(tetrahydrofuran)diols, polyester polyols, polycarbonate polyols and polysiloxane polyols. Polyester polyols are particularly attractive because of their commercial availability, oxidative stability and versatility to tailor the characteristics of the coating by tailoring the backbone. One of the problems encountered in using most polyesters is their hydrolytic instability and oil sensitivity.

In this respect, a continuous search is going on in the field of optical fiber coatings for alternative coatings with suitable properties. In WO 98/56846, it is suggested to improve the resistance to hydrolysis by using (a urethane oligomer with) a polyester backbone consisting mainly of polymerized diol and diacid and/or hydroxy acid components wherein the diol component has at least one carbon at the β-position with respect to the hydroxyl groups which is substituted with a group containing at least one carbon atom. The disadvantage of the polyesters described in WO 98/56846 is that they have a relatively high viscosity and hence, a higher concentration of diluents is needed, thus limiting the selection of properties.

In JP-A-2216947 a urethane acrylate oligomer is suggested in which the backbone can be an alkyd polyester that can be obtained by reacting a fatty acid such as soy oil, linseed oil, safflower oil, palm oil, dehydrated ricinus oil, dehydrocastor oil, or tung oil with a polyacid and a polyol. The radiation-curable optical fiber inner primary composition comprising the urethane acrylate oligomer described in JP-A-2216947 is solvent-based, which clearly is a drawback. Moreover, the oils on which alkyds in JP-A-2216947 are based all contain considerable unsaturation.

Among many other efforts, EP-A1-539030 suggests to use polyester polyols wherein the acid-component and/or the hydroxyl component residues of the polyester polyol are partially comprised of dimer acids. The dimer acids suggested in EP-A1-539030 are usually unsaturated, but can also be hydrogenated to remove a substantial proportion of the unreacted double bonds. However, dimer acids have the disadvantage of swelling in hydrocarbon oil, which is representative of cabling gel filling type compounds. U.S. Pat. Nos. 4,629,287, 4,609,718, and 4,608,409 all mention the use of dimer fatty acids which are dicarboxylic acids formed by dimerizing fatty acids which usually contain 18 carbon atoms, and thus providing a 36 carbon atom dicarboxylic acid.

So far, very few alternatives for fiber optic coatings with appropriate coating characteristics, such as a combination of a low water sensitivity and a low oil sensitivity, have been found.

SUMMARY OF THE INVENTION

An object of the present invention therefore is to provide a radiation-curable solvent-free coating composition which exhibits low water sensitivity and low oil sensitivity. The radiation-curable solvent-free coating composition can also exhibit other comparable coating properties as the presently used coatings based on polyether oligomers, such as tetrahydrofuran-based polyether oligomers.

This has been achieved according to the present invention by a radiation-curable solvent-free coating composition for optical fiber comprising
(A) a radiation-curable urethane (meth)acrylate oligomer comprising an alkyd backbone,
(B) a reactive diluent,
(C) a photoinitiator, and optionally
(D) an additive.

The alkyds used as backbones in the urethane acrylate oligomers of the present invention have the advantage that they are conveniently available from renewable resources and are readily manufactured using conventional equipment from readily available starting materials. The alkyd-based compositions are more friendly to the environment than ordinary polyesters.

Furthermore, the alkyd-based compositions of the present invention are essentially free of solvent, meaning that there is less than 2% solvent present in the compositions. This is advantageous because there occurs no evaporation of solvents during film formation. The alkyd-based compositions can be derived from solvent-free reactions and are suitable for use in UV curable coating compositions.

Moreover, the alkyd-based compositions of the present invention show good thermal-oxidative stability as measured by discoloration, also determined as good yellowing resistance under aging conditions such as high temperature and/or high humidity (125° C./dry or 85° C./85% RH), which means that they result in substantially colorless compositions.

Further, the alkyd-based compositions according to the present invention show good hydrolysis resistance, and acceptable oil and water sensitivity. The mineral oil resistance is better than that of polyesters based on dimer acids.

DETAILED DESCRIPTION

The radiation-curable urethane (meth)acrylate oligomer includes an alkyd backbone. The alkyd backbone is derived from an alkyd resin. Alkyd resins, or alkyds, are polyesters having pendant ester group protruding off of a main polymer chain of ester linkages. The pendant group of the alkyd can be introduced by including a monofunctional carboxylic acid (monoacid) along with the ordinary components used to prepare a polyester. The pendant ester group contributes to the properties of alkyds and makes them considerably different from conventional polyesters. In other words, alkyds can be distinguished by the presence of a monoacid as an essential part of the composition.

The number average molecular weight of the alkyd backbone is at least about 300, preferably, at least about 500, more preferably, at least about 900. The number average molecular weight is less than about 10,000, preferably less than about 5,000, more preferably less than about 3,000.

The alkyd can be made by any method. Preferably, alkyd resins can be prepared by condensation reactions of polyfunctional alcohols (hereafter referred to as polyols), polyfunctional carboxylic acids (hereafter referred to as polyacids), and oils or fatty acids derived from the oils. The oil can be a natural oil (which consists of an ester, e.g., a triester, of glycerol and fatty acids). For example, a polyol/fatty acid mixture can be prepared in-situ by alcoholysis of a naturally derived oil or by direct esterification of a polyol with a naturally derived long chain fatty acid. The resulting product from either of these reactions can then polymerized with other polyols and polyacids (e.g., diols and diacids) as in conventional polyesterification. More preferably, the alkyd is prepared by alcoholysis of a naturally derived oil, in particular one with a low degree of unsaturation.

The amount of oil present in the alkyd is important in dictating the properties of the final resin. The amount of oil present is traditionally classified in terms of the oil length of the alkyd, a concept originally based on compositions containing only glycerol as the polyol. The longer the oil length of the alkyd, the more oil is present. The alkyd resin can be a long oil alkyd having an oil content (i.e. oil length) of about 60–90%, a medium long oil alkyd, having an oil length of about 40–60% or a short oil alkyd having an oil length of about 10–40%. Similarly, phthalic anhydride content of a long oil is about 25% by weight, while that of a short oil may be as high as 50%. Accordingly, a wide variety of oil lengths can be attained.

Any polyacid, polyol, and monoacid can be used in the manufacture of alkyds. As the polyacid component, polyfunctional carboxylic acids and the corresponding anhydrides can be used, preferably polyfunctional carboxylic acids and the corresponding anhydrides, for example, phthalic acid or anhydride, isophthalic acid, terephthalic acid, maleic acid or anhydride, fumaric acid, itaconic acid or anhydride, succinic acid or anhydride, adipic acid, sebacic acid, azelaic acid, citric acid, trimellitic acid or anhydride, pyromellitic acid or dianhydride, tetrahydrophthalic acid or anhydride, endomethylenetetrahydrophthalic acid or anhydride, cyclohexane dicarboxylic acid, glutaric acid, dodecane dioic acid, dimer-fatty acid and the like. Also, mixtures of acids may be used. In particular preferred are adipic acid, orthophthalic acid, isophthalic acid, and terephthalic acid.

As suitable polyol compounds, polyfunctional alcohols can be used, for example, pentaerythritol, glycerol, trimethylol ethane, trimethylol propane, ethylene glycol, 1,3-propanediol, 1,4-butanediol, 1,6-hexanediol, diethylene glycol, triethylene glycol, dipropylene glycol, 1,2-propanediol, 1,2-butanediol, 1,3-butanediol, neopentyl glycol, 2-butyl-2-ethyl-1,3-propanediol (BEPD), hydroxypivaloyl hydroxypivalate (HPN), polyethylene glycol, polypropylene glycol, ethoxylated bisphenol-A having 2–12 ethylene oxide units, propoxylated bisphenol-A having 2–12 propylene oxide units, dipentaerythritol, sorbitol and the like. Preferably, trialcohol alkanes (such as, for example, glycerol, trimethylol propane (TMP), trimethylol ethane), pentaerythritol (PE), neopentyl glycol (NPG), 2-butyl-2-ethyl-1,3-propanediol (BEPD), and hydroxypivaloyl hydroxypivalate (HPN) are used.

The monoacid is any monocarboxylic acid having between 4 and 28 carbon atoms. Preferably, the monoacid is a fatty acid, more preferably a long chain monoacid. A long chain monoacid, or long chain fatty acid, is characterized as having between 12 and 28 carbon atoms in their chain; more preferably, between 12 and 24 carbon atoms. Most fatty acids have 18 carbon atoms in their chain, but also a higher number of carbon atoms in naturally derived oils is possible. For example, $C_{22}$ acid, erucic acid (docosenoic acid), is found in some varieties of rapeseed oil. Preferably, naturally derived fatty acids or oils from which fatty acids are derived, as known to those skilled in the art, are fatty acids or oils originating from vegetable or animal sources.

The average chain length of a fatty acid can be determined by the saponification value, which increases as the chain length decreases. For example, when an oil is saponified with an alkali to yield glycerol and a soap, it is possible to determine the saponification value and the free carboxylic acid content of the oil.

The fatty acids or oils suitable in the alkyd backbones according to the present invention can be unsaturated or saturated. Preferably, the fatty acids or oils according to the present invention have a low degree of unsaturation, as defined hereunder. Examples of unsaturated oils or fatty acids (derived from the oils) include castor oil, corn oil, cottonseed oil, rapeseed oil, low eruric rapeseed oil, hempseed oil, kapok oil, linseed oil, wild mustard, oiticica oil, olive oil, palm oil, peanut oil, perilla oil, poppyseed oil, tobaccoseed oil, argentine rapeseed oil, rubberseed oil, safflower oil, sesame oil, soybean oil, sugarcane oil, sunflower oil, tall oil, teaseed oil, tung oil, black walnut oil, or mixtures thereof, and the like.

Examples of fatty acids/oils having a low degree of unsaturation include Coconut oil, Babassu oil, Chinese Tallow oil, Ouri-Curl oil, Palm Kernel oil, caprylic acid, caproic acid, capric acid, coconut fatty acid, lauric acid, myristic acid, palmitic acid, stearic acid, and the like or mixtures thereof, fatty acids derived from the oils, as well as the hydrogenated form of unsaturated oils and fatty acids derived from the oils, such as castor oil, corn oil, cottonseed oil, rapeseed oil, low eruric rapeseed oil, hempseed oil, kapok oil, linseed oil, wild mustard, oiticica oil, olive oil, palm oil, peanut oil, perilla oil, poppyseed oil, tobaccoseed oil, argentine rapeseed oil, rubberseed oil, safflower oil, sesame oil, soybean oil, sugarcane oil, sunflower oil, tall oil, teaseed oil, tung oil, black walnut oil, or mixtures thereof, and the like.

The unsaturation in the fatty acid side chains of an alkyd generally is indicated by the Iodine or hydrogen value, which value increases with an increase in unsaturation. The iodine value of the oils or fatty acids is a commonly used parameter to indicate their degree of unsaturation. The iodine value is the number of grams of iodine absorbed by 100 grams of oil. This test measures the unsaturation of oils by determination of the amount of iodine reacted at the double bonds. The Wijs method is most commonly used. Iodine absorption is determined by titrating unreacted reagent with sodium thiosulphate, and can be expressed as follows:

$$\text{Iodine value} = \frac{(12.69 \times \text{mL thiosulphate} \times \text{normality})}{\text{mass of sample (g)}} \quad (1)$$

The iodine value of the oils or fatty acids generally will be less than 210 centigrams Iodine/gram sample, preferably, less than 150 centigrams Iodine/gram sample, more preferably less than 100 centigrams Iodine/gram sample. For the oils or fatty acids having a low degree of unsaturation, the iodine value generally will be less than 40 centigrams Iodine/gram sample, preferably less than 25 centigrams Iodine/gram sample and more in particular less than 15 centigrams Iodine/gram sample. According to a preferred embodiment of the present invention the alkyd backbone comprises fatty acid side chains with a low degree of unsaturation and thus, the iodine value of the alkyd should preferably be lower than 25 centigrams Iodine/gram sample, more preferably lower than 10 centigrams Iodine/gram sample so as to minimize the effect on yellowing.

The hydroxyl value is a measure of the amount of hydroxyl groups, measured by titrating back the reaction product of the alkyd with acetic anhydride, and is expressed as:

$$\text{Hydroxyl value} = \frac{\text{the number of mg of potassium hydroxide (KOH)}}{\text{mass of resin or polymer (g)}} \quad (2)$$

The hydroxyl value of the alkyd oligomer of the present invention generally is at least about 15, preferably at least about 20 and generally is less than about 200, preferably less than about 170, more preferably less than about 150.

The alkyds of the present invention generally will have an average hydroxyl functionality of between 1.5 and 5 preferably between 1.8 and 3. It is most preferred, to use substantially linear polymers (i.e. an average functionality between 1.8 and 2.2).

The acid value is a measure of the free carboxylic acids content of a resin and is expressed as the number of milligrams of potassium hydroxide required to neutralize the free carboxylic acids in one gram of the resin. A weighed quantity of the resin is dissolved in a solvent such as toluol together with neutralized ethyl alcohol and titrated with carbonate-free decinormal sodium hydroxide solution to a phenolphthalein end point. The acid value can be expressed by:

$$\text{Acid value} = \frac{(56.1 \times \text{mL NaOH} \times \text{normality})}{\text{mass of resin (g)}} (\text{mg KOH/g resin}) \quad (3)$$

The acid number of the alkyd resins of the present invention is preferably minimized, and is generally lower than about 10 mg KOH/g, preferably lower than about 5 mg KOH/g. An alkyd resin having a low acid number will positively influence aging properties, minimize the water sensitivity and will not slow down the urethane reaction.

(A) The Oligomer System

In general, an oligomer system is first prepared, optionally in the presence of a reactive diluent. Then, the oligomer formulation is further formulated by mixing with other ingredients such as reactive diluents, one or more photoinitiators, and additives. If multiple oligomers are desired, individual oligomers can be synthesized separately, and then mixed, or they can be synthesized together in a single, one-pot synthesis. In either case, the synthesis of oligomers often produces a statistical distribution of different types of oligomers which can be represented by idealized structures.

If some ingredients from the reactive diluent system (see below) are present during oligomer synthesis, they are not considered part of the pre-polymer system because, in general, reactive diluents do not react substantially during oligomer preparation and merely function as solvents for the purpose of viscosity control. In general, a reactive diluent can be distinguished from an oligomer because it will have a lower molecular weight than an oligomer, and will serve to decrease the viscosity of an oligomer. However, some reactive diluents can have repeating units such as repeating alkoxy units. However, for this invention, if the diluent functions to decrease the viscosity of the oligomer, then it is a called a diluent rather than an oligomer.

The amount of the oligomer system (A) can be, for example, about 10 wt. % to about 90 wt. %, and preferably, between about 15 wt. % to about 80 wt. %, and more preferably, about 20 wt. % to about 70 wt. %. If more than one oligomer is present, then the wt. % of each oligomer is added.

There is no particular limitation on the molecular weight of the oligomer, but the number average molecular weight of the oligomer in general can be less than about 25,000 g/mol, and preferably, less than about 10,000 g/mol, and more preferably, less than about 5,000 g/mol. Molecular weight is preferably greater than about 500 g/mol.

(A). 1. Preparation of Alkyd:

Hydroxy terminated alkyds have been made by each of two distinct methods of synthesis. In one method an appropriate oil is first reacted with a multi-functional alcohol in a reaction known as alcoholysis. The triglyceride oil is reduced to a monoglyceride and produces a fatty acid ester of the alcohol as a coproduct. This mixture is then reacted in a conventional polyesterification with another diol and suitable diacids, producing the hydroxy-terminated alkyd. In the alternative method, known as direct esterification, the isolated fatty acid is added directly to a polyol and diacid mixture and polymerized, as in conventional polyesterification producing the hydroxy-terminated alkyd.

(A).2. Preparation of Alkyd Urethane Acrylate Oligomer:

The hydroxy-functional alkyd is reacted with a polyisocyanate and a compound providing the reactive termini in order to yield the urethane oligomer.

Polyisocyanates suitable for use in making the compositions of the present invention can be aliphatic, cycloaliphatic or aromatic and include diisocyanates, such as 2,4-toluene diisocyanate, 2,6-toluene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexyl)isocyanate, 2,2,4-trimethylhexamethylene diisocyanate, bis(2-isocyanate-ethyl) fumarate, 6-isopropyl-1,3-phenyl diisocyanate, 4-diphenylpropane diisocyanate, lysine diisocyanate, hydrogenated diphenylmethane diisocyanate, hydrogenated xylylene diisocyanate, tetramethylxylylene diisocyanate, and 2,5(or 6)-bis(isocyanatomethyl)-bicyclo[2.2.1]heptane. Among these diisocyanates, 2,4-toluene diisocyanate, isophorone diisocyanate, xylylene diisocyanate, and methylenebis(4-cyclohexylisocyanate) are particularly preferred. These diisocyanate compounds are used either individually or in combination of two or more.

The compound providing the reactive termini may comprise an ethylenic unsaturation such as acrylate or methacrylate, which will further be denoted as (meth)acrylate. The reactive termini can be introduced by reacting a hydroxyl functional compound with an isocyanate compound. Examples of the (meth)acrylate compounds having a hydroxyl group which are suitable for use in the present invention include 2-hydroxyethyl (meth)acrylate, 2-hydroxypropyl (meth)acrylate, 2-hydroxybutyl (meth)acrylate, 2-hydroxy-3-phenyloxypropyl (meth)acrylate, 1,4-butanediol mono(meth)acrylate, 2-hydroxyalkyl(meth)acryloyl phosphate, 4-hydroxycyclohexyl (meth)acrylate, 1,6-hexanediol mono(meth)acrylate, neopentyl glycol mono (meth)acrylate, trimethylolpropane di(meth)acrylate, trimethylolethane di(meth)acrylate, pentaerythritol tri(meth)acrylate, dipentaerythritol penta(meth)acrylate, (meth)acrylates represented by the following structural formulas, $$CH_2=C(R^1)-COOCH_2CH_2-(OCOCH_2CH_2CH_2CH_2CH_2)_n-OH$$

$$CH_2=C(R^1)-COOCH_2CH_2(OH)CH_2-O-(C_6H_5)$$

$$CH_2=C(R^1)COO[CH_2CH(R^2)O-]_nH$$

wherein $R^1$ is a hydrogen atom or a methyl group, $R^2$ is hydrogen or $C_1-C_4$ alkyl group, and n denotes an integer of 1–15. In addition, compounds obtained by an addition reaction between a compound containing a glycidyl group, such as, alkyl glycidyl ether, allyl glycidyl ether, or glycidyl (meth)acrylate, and (meth)acrylic acid can also be used. Among these (meth)acrylates having a hydroxyl group, particularly desirable are 2-hydroxyethyl acrylate and 2-hydroxypropyl acrylate. These (meth)acrylates having a hydroxyl group may be used either individually or in combination of two or more.

Preferred alkyd urethane acrylate oligomers are alkyds derived from coconut oil or coconut fatty acid (with an Iodine value of less than about 10), an aliphatic diisocyanate and an hydroxy functional acrylate.

(B) The Reactive Diluent System

The compositions according to the invention also comprise a reactive diluent system (also called monomer or monomer diluent) which comprises at least one reactive diluent. The reactive diluent can be used to adjust the viscosity of the coating composition. Thus, the reactive diluent can be a low viscosity monomer containing one functional group capable of polymerization when exposed to actinic radiation or diluents having a plurality of functional groups.

The reactive diluent is preferably added in such an amount that the viscosity of the coating composition at room temperature is in the range of about 500 to about 20,000 mPa.s, preferably in the range of about 1,000 to about 10,000 mPa.s.

Suitable amounts of the reactive diluent have been found to be about 10 wt % to about 90 wt %, and more preferably about 20 wt. % to about 80 wt. %, and more preferably, about 30 wt. % to about 70 wt. %.

A reactive diluent preferably has a molecular weight of not more than about 550 or a viscosity at room temperature of not more than about 300 mPa.s (measured as 100% diluent).

The radiation-curable functional group present on the reactive diluent may be of the same nature as that used in the radiation-curable oligomer. Preferably, the radiation-curable functional group present in the reactive diluent is capable of copolymerizing with the radiation-curable functional group present on the radiation-curable oligomer. Ethylenic unsaturation is preferred. In particular, (meth)acrylate unsaturation is preferred.

Preferably, the reactive diluent system comprises a monomer or monomers having an acrylate or N-vinyl functionality and a $C_4-C_{20}$ alkyl or polyether moiety. Examples of such reactive diluents include hexylacrylate, 2-ethylhexylacrylate, isobornylacrylate, decylacrylate, laurylacrylate, stearylacrylate, ethoxyethoxyethylacrylate, laurylvinylether, 2-ethylhexylvinyl ether, N-vinyl formamide, isodecyl acrylate, isooctyl acrylate, N-vinylcaprolactam, N-vinylpyrrolidone and the like.

Another type of reactive diluent is a compound comprising an aromatic group. Examples of diluents having an aromatic group include:
ethyleneglycol phenylether acrylate,
polyethyleneglycol phenylether acrylate,
polypropyleneglycol phenylether acrylate, and
alkyl-substituted phenyl derivatives of the above monomers, such as polyethyleneglycol nonylphenylether acrylate.

Furthermore, a reactive diluent can contain two groups capable of polymerization using actinic radiation. A diluent having three or more of such reactive groups can be present as well. Examples of such monomers include:
$C_2-C_{18}$ hydrocarbon diol diacrylates,
$C_4-C_{18}$ hydrocarbon divinylethers,
$C_3-C_{18}$ hydrocarbon triol triacrylates,
the polyether analogs thereof, and
the like, such as
1,6-hexanedioldiacrylate,
trimethylolpropane triacrylate,
hexanediol divinylether,
triethyleneglycol diacrylate,
pentaeritritol triacrylate,
tripropyleneglycol diacrylate
alkoxylated bisphenol A diacrylate.

Preferably, the oligomer and the reactive diluent each contain an acrylate group as a radiation-curable group.

Among this list, isobornyl acrylate, ethoxylated bisphenol A diacrylate, hexane diol diacrylate and trimethylolpropane triacrylate are particularly preferred.

The alkyd-based coating compositions of the present invention are essentially free of solvent, in particular, organic solvents, meaning that there is less than 2% solvent present in said coating compositions, preferably less than 1%, more preferably less than 0.5%.

(C) The Photoinitiator System

The composition may (optionally) further comprise at least one photoinitiator. A photoinitiator is required for a fast UV cure but may be omitted for electron beam cure. Conventional photoinitiators can be used. Examples include benzophenone- and/or acetophenone derivatives, such as alpha-hydroxy alkylphenyl ketones, benzoin alkyl ethers and benzil ketals, monoacylphosphine oxides, and bisacylphosphine oxides. Preferred photoinitiators are 1-hydroxy-cyclohexyl phenyl ketone (Irgacure 184, Ciba Geigy), 2-hydroxy-2-methyl-1-phenyl-propan-1-one (Darocur 1173), and (2,4,6-trimethylbenzoyl)diphenyl phosphine oxide (Lucirin TPO).

Often mixtures of photoinitiators provide a suitable balance of properties, for example Irgacure 1700, also called BAPO, (25% bis(2,6-dimethoxybenzoyl)-2,4-,4-trimethyl pentyl phosphine oxide and 75% 2-hydroxy-2-methyl-1-phenyl-propan-1-one), and the like.

The amount of photoinitiator system is not particularly limited but will be effective to provide fast cure speed, reasonable cost, good surface and through cure, and lack of yellowing upon aging. Typical amounts can be, for example, about 0.3 wt. % to about 10 wt. %, and preferably, about 1 wt. % to about 5 wt. %.

(D) Additives

Conventional additives can be used in effective amounts. For example, additives such as stabilizers to prevent gellation, UV screening compounds, leveling agents, polymerization inhibitors, adhesion promoters, light stabilizers, chain transfer agents, colorants including pigments and dyes, plasticizers, fillers, wetting improvers, release additives (in particular, in inks and matrix materials) preservatives, and the like can be used. For inner primary coatings, an adhesion promoter may be added. Examples of suitable adhesion promoters include acid functional materials or organofunctional silanes. Organofunctional silane adhesion promotors are preferred, because acid-functional materials possibly show corrosivity towards the materials and tendency to loose their adhesion properties on exposure to moisture. Various suitable organofunctional silanes include but are not limited to amino-functional silanes; acrylamido-functional silanes; alkyl-functional silanes; vinyl-functional silanes; (meth)acrylate-functional silanes; and mercapto-functional silanes. The adhesion promoters preferably are methoxy- or ethoxy-substituted.

Other polymers and oligomers can be added to the compositions. Moisture content in the coatings is preferably minimized.

Coatings and Coating Properties

The composite oligomer can be incorporated into inner primary coating compositions, outer primary coating compositions, ink compositions, matrix forming compositions, and bundling materials, which can be colored or non-colored. The composite oligomer also can be incorporated into so-called single coating systems. It is preferred to use alkyd-based urethane acrylate oligomers in harder coatings such as outer primary coatings, ink compositions, matrix and bundling materials.

Specifically, the hydrocarbon nature of the alkyds offers a lower surface energy material which results in compositions/materials with good release properties. Preferably, inks, matrix material and/or the bundling materials are formed from the alkyd-based urethane acrylate oligomers to provide systems with improved break-out characteristics. In addition, the use of alkyd-based urethane acrylate oligomers in inks and/or other compositions incorporating colorants, such as dyes and particularly pigments, provide better wetting and/or compatibility of the colorant.

In general, the coating substrate, which includes optical fiber, will be an inorganic or glass substrate, although in principle, other substrates such as polymeric substrates may also be effectively used. In a preferred application, the coating substrate is an optical glass fiber, and in particular, a freshly drawn, pristine optical glass fiber. Freshly prepared optical glass fiber is known in the art to be responsive to glass coupling agents.

The radiation-curable composition of the present invention may be formulated such that the composition after cure has a modulus as low as 0.1 MPa and as high as 2,000 MPa or more. Those having a modulus in the lower range, for instance, from 0.1 to 10 MPa, preferably 0.1 to 5 MPa, and more preferably 0.5 to less than 3 MPa are typically suitable for inner primary coatings for fiber optics. In contrast, suitable compositions for outer primary coatings, inks and matrix materials generally have a modulus of above 50 MPa, with outer primary coatings tending to have a modulus more particularly above 100 MPa up to 1,000 MPa and matrix materials tending to be more particularly between about 50 MPa to about 200 MPa.

Elongation and tensile strength of these materials can also be optimized depending on the design criteria for a particular use. For cured coatings formed from radiation-curable compositions formulated for use as inner primary coatings on optical fibers, the elongation-at-break is typically greater than 80%, more preferably the elongation-at-break is at least 110%, more preferably at least 150% but not typically higher than 400%. For coatings formulated for outer primary coatings, inks and matrix materials the elongation-at-break is typically between 3% and 100%, and preferably higher than 30%.

The glass transition temperature (Tg), measured as the peak tan-delta determined by dynamic mechanical analysis (DMA), can be optimized depending on the particulars of the application. The glass transition temperature may be from 10° C. down to −70° C. or lower, more preferably lower than −10° C. for compositions formulated for use as inner primary coatings and 10° C. to 120° C. or higher, more preferably above 30° C., for compositions designed for use as outer primary coatings, inks and matrix materials.

The compositions of the present invention will preferably have a cure speed of 1.0 J/cm$^2$ or less(at 95% of maximum attainable modulus). For a coating, ink or matrix material, cure speed is preferably about 0.5 J/cm$^2$ or less (at 95% of maximum attainable modulus), and more preferably, about 0.3 J/cm$^2$ or less, and even more preferably, about 0.2 J/cm$^2$ or less.

As an example, a coating formulation resulting in outer primary type mechanical properties is given. The components of the formulation are an oligomer, isobomylacrylate, ethoxylated bisphenol-A acrylate (BPAEDA), and an additional crosslinking monomer as either hexanediol diacrylate (HDDA) or trimethylolpropane triacrylate (TMPTA).

The radiation-curable coating compositions of the present invention, when tested in accordance with the method set forth in the Examples, show a hydrolysis resistance of less than 30%, preferably less than 20%, more preferably less than 16%.

The coating compositions of the present invention, after cure, show a dynamic water sensitivity of less than 2%, preferably less than 1.6%, and more preferably less than 1.4%.

The radiation curable coating compositions according to the present invention, when cured, show very good yellowing resistance, measured by ΔE, after exposure to 125° C. for 8 weeks, preferably ΔE is less than 70, more preferably less than 60.

The present invention will be further explained by use of the following non-limiting examples.

EXAMPLES

Alkyds synthesized by the alcoholysis method are referred to as "glycerine based" alkyds since this was the alcohol used in the alcoholysis step. Alkyds synthesized by the direct esterification method are referred to as either "TMP based" or "PE based", depending upon whether trimethylolpropane (TMP) or pentaerythritol (PE) was used for the esterification of the fatty acid. The resulting glycerides can then be polymerized with 2-butyl-2-ethyl-1,3-propanediol (BEPD) or neopentyl glycol (NPG), isophthalic acid, and adipic acid to result in the hydroxy-terminated alkyd. The hydroxy-terminated alkyds were then converted to urethane acrylate oligomers by reaction with either isophorone diisocyanate (IPDI) or toluene diisocyanate (TDI) and hydroxyethyl acrylate (HEA) according to the conventional method of synthesis for a man skilled in the art. The oligomers contained 20% by weight of isobornyl acrylate (IBOA) when used in outer primary type coatings.

Examples I–III

Example I correlates with the oil based alkyd.
Example II refers to the fatty acid based alkyd.
Example III relates to the commercial Priplast 3184 trifunctional polyester polyol (fatty acid).
Table 1 represents alkyd-1 and alkyd-2 compositions and their properties.
Table 2 describes the urethane acrylate oligomers and their properties.
Table 3 describes the coating formulations and their properties; Examples I.1, I.2, II.1, II.2 and III relate to outer primary coating compositions.
Table 4 summarizes the performance properties of the compositions of Table 3.

TABLE 1

Alkyd compositions and properties

|  | Alkyd-I | alkyd-II |
|---|---|---|
| coconut oil | 18.07 | — |
| coconut fatty acid | — | 17.93 |
| glycerine | 5.08 | — |
| trimethylol propane | — | 11.71 |
| BEPD | 39.80 | — |
| neopentylglycol | — | 28.79 |
| isophthalic acid | 25.68 | 28.80 |
| adipic acid | 11.28 | 12.67 |
| DBTO | 0.09 | — |
| FASCAT ® 4100 | — | 0.10 |
| mole % glyceride | 25 | 25 |
| viscosity, Pas | 109.6 | 182.50 |
| hydroxyl value | 123 | 137 |

BEPD = 2-butyl-2-ethyl-1,3-propanediol
DBTO = dibutyltin oxide (Elf-Atochem)
coconut oil: Iodine value of less than 10 centigrams Iodine per gram sample
FASCAT ® 4100 = butylstannoic acid (Elf-Atochem)

TABLE 2

Urethane acrylate (UA-) oligomers and properties

| UA-oligomer | UA-I | UA-II | UA-III | UA-IV |
|---|---|---|---|---|
| alkyd-I | 45.88 | — | — | — |
| alkyd-II | — | 46.72 | — | 43.70 |
| Priplast 3184 | — | — | 20.07 | — |
| isophorone diisocyanate | 22.37 | — | 32.77 | 23.78 |
| toluene diisoeyanate | — | 19.91 | — | — |
| BHT | 0.05 | 0.05 | 0.05 | 0.05 |
| dibutyl tin dilaurate | 0.05 | 0.05 | 0.05 | 0.05 |
| hydroxy ethyl acrylate | 11.65 | 13.27 | 17.07 | 12.42 |
| isobornyl acrylate | 20.00 | 20.00 | 30.00 | 20.00 |
| viscosity (Pas) | Semi-solid | 903.8 | 190 | 903.8 |
| Gardner color | <1 | <1 |  | <1 |
| Isocyanate content (%) | 0.08 | 0.02 |  | 0.02 |

Semi-solid = >10⁶ Pas @ 25° C. but not gelled
Priplast 3184 = trifunctional polyester based on $C_{18}$ fatty acid having an iodine value of 40, polyglycol and phthalic anhydride (Unichema)

TABLE 3

Coating compositions and properties

|  | Ex. I.1 | Ex. I.2 | Ex. II.1 | Ex. II.2 | Ex. III | Ex. IV |
|---|---|---|---|---|---|---|
| Composition grams | | | | | | |
| oligomer UA-I | 20.63 | 20.63 | — | — | — | — |
| oligomer UA-II | — | — | 20.63 | 20.63 | — | — |
| oligomer UA-III | — | — | — | — | 28.28 | — |
| oligomer UA-IV | — | — | — | — | — | 69.96 |
| H-I-PTGL1000-I-H | — | — | — | — | 3.04 | — |
| SR-504A | — | — | — | — | 10.99 | — |
| SR-504D | — | — | — | — | — | 4.00 |
| IBOA | 4.88 | 4.88 | 4.88 | 4.88 | — | — |
| VC | — | — | — | — | — | 5.31 |
| BPAEDA | 1.50 | 3.00 | 1.50 | 3.00 | 54.3 | — |
| PEA | — | — | — | — | — | 13.23 |
| HDDA | 3.00 | — | 3.00 | — | — | — |
| TPGDA | — | — | — | — | — | 4.00 |
| TMPTA | — | 1.50 | — | 1.50 | — | — |
| LUCERIN ® TPO | — | — | — | — | 0.97 | — |
| IRGACURE ® 184 | — | — | — | — | 1.94 | 3.00 |
| DAROCUR ® 1173 | 0.90 | 0.90 | 0.90 | 0.90 | — | — |
| IRGANOX ® 1035 | — | — | — | — | 0.48 | 0.50 |
| Properties | | | | | | |
| viscosity (mPas, 25° C.) | 3750 | 9875 | 7775 | 21650 | 3830 | 6750 |
| Modulus (MPa @ 1J/cm²) | 1478 | 1237 | 1568 | 1680 | 1527 | 976 |
| Elongation (%) | 4.0 | 6.0 | 4.0 | 4.0 | 5.0 | 24.0 |
| Peak tan delta (° C.) | 70.9 | 77.1 | 66.9 | 74.0 | 69.0 | 54.0 |
| Equil. Modulus (MPa) | 14 | 12 | 13 | 11 | 28 | 4.94 |

Ex. I.1. and Ex. II.1.: low concentration of BPAEDA
Ex. I.2. and Ex. II.2.: high concentration of BPAEDA
IBOA = isobornyl acrylate
VC = vinylcaprolactam
BPAEDA = ethoxylated bisphenol A diacrylate
PEA = phenoxyethyl acrylate
HDDA = hexanediol diacrylate
TPGDA = tripropyleneglycol diacrylate
TMPTA = trimethylolpropane triacrylate
DAROCUR ® 1173 = 2-hydroxy-2-methyl-1-phenylpropane-1-one (Ciba Geigy)
SR504A/D = ethoxylated nonyl phenol acrylate ester (Sartomer)
LUCERIN ® TPO = (2,4,6-trimethylbenzoyl) diphenyl phosphine oxide (BASF)
IRGACURE ® 184 = 1-hydroxy-cyclohexyl-phenylketone (Ciba Geigy)
IRGANOX ® 1035 = Thiodiethylene bis(3,5-di-tert-butyl-4-hydroxy) hydrocinnamate (Ciba Geigy)

TABLE 4

Performance properties of formulations of Table 3

|  | Ex. I.1 | Ex. I.2 | Ex. II.1 | Ex. II.2 | Ex. III | Ex. IV |
|---|---|---|---|---|---|---|
| hydrolysis resistance (%) (loss in equilibrium modulus) | <20 | <20 | <15 | <15 | 15.6 | 16.4 |
| dynamic water sensitivity (%) | <1.2 | <1.2 | <1 | <1 |  | 1.2 |
| dynamic oil sensitivity (%) | <1.2 | <1.2 | <0.5 | <0.5 | 0.37 | 0.6 |
| yellowing resistance/color change: |  |  |  |  |  |  |
| at 85° C./85% RH, 30 days, ΔE |  |  |  |  | 10.36 | 9.2 |
| under high intensity fluorescence, ΔE (56 days) |  |  |  |  | 2.76 (3.30) | 4.5 |
| under low intensity fluorescence, ΔE (56 days) |  |  |  |  | 2.78 (3.36) | 3.2 |
| at 125° C., ΔE (56 days) | 48 | 45 | 68 | 69 | 38.44 (48.2) | — |

Test Methods:

Hydrolysis Resistance:

The coating formulations of Ex. I, II and III were subjected to hydrolysis at 85° C. and 85% relative humidity (RH) for 30 days. The results of the hydrolytic stability is described in terms of loss of equilibrium modulus after 30 days exposure. The formulations I.1 and I.2 show less than a 20% loss in equilibrium modulus after 30 days exposure, and the formulations II.1 mand II.2 based on neopentylglycol (NPG) show substantially less than a 15% loss.

The results also show that lower levels of glyceride content may be better for hydrolysis resistance.

Example III showed a loss in equilibrium modulus of 15.6%.

Dynamic Water Sensitivity:

A total water sensitivity of the formulations of Ex. I.1 and Ex. I.2 of less than 1.2% was observed.

Dynamic Oil Sensitivity:

This test measures the ability to resist mineral oils which would be representative of cabling gel type materials. The results of the resistance to mineral oil is reflected in terms of total sensitivity measured by percent weight change after room temperature exposure for three weeks. It appears that both formulations I.1 and I.2 are easily capable of resisting mineral oil, as evidenced by total sensitivity values generally less than 1.2%. This is even more pronounced for Ex. III with a dynamic oil sensitivity of 0.37%.

Yellowing Resistance at 125° C.:

Film yellowing after exposure to 125° C. for 56 days was determined for each set of formulations and is represented in terms of delta E value for the oligomers containing 25 mole %/glyceride for both NPG and BEDP containing alkyds.

The results indicate that coconut oil alkyds are substantially better in resisting environmental yellowing than the corresponding soya oil alkyds. Ex. III shows a ΔE-value of 38.44.

General Examples V–VII on Synthesis Procedure:

Example V

The coconut oil alkyd synthesis procedure (alkyds made by alcoholysis) was as follows:

Coconut oil, glycerine and dibutyltin oxide (DBTO) were mixed together and the temperature was slowly raised to 210° C. under a nitrogen atmosphere and was kept at 210° C. until dilution with 4:1 methanol (v:v) is clear for 15 min. Then, the mixture was cooled to 100° C. and BEPD, isophthalic acid, adipic acid and DBTO were added. The mixture was distilled to collect water until an acid value less than 5 mg KOH/gram was achieved and approximately 49.7 grams of water had been collected.

This procedure counts for alkyd-I of Table 1.

Example VI

The coconut fatty acid synthesis procedure (alkyds made by direct esterification) was as follows:

Prifac® 7901 (coconut oil/palm Kernel oil fatty acid from Unichema), trimethylol propane (TMP), and butyl stannoic acid (Fascat® 4100 Elf-Atochem) were mixed together and the mixture was heated to 185° C. under a nitrogen blanket. The mixture was kept at 185° C. until an acid value of less than 5 mg KOH/gram was achieved and approximately 8 grams of water was collected. Then, the mixture was cooled to 125° C. and neopentylglycol (NPG), isophthalic acid and adipic acid were added. The mixture was slowly heated to 220° C. and water was collected. The mixture was kept at 220° C. until an acid value of less than 4 mg KOH/gram was achieved and approximately 50 grams of water were collected. This procedure counts for alkyd-II of Table 1.

Example VII

Synthesis Procedure of Urethane Acrylates (Table 2):

The isocyanate (e.g. IPDI or TDI), BHT and DBTDL were mixed together under a dry air blanket to dissolve. HEA was added dropwise in 60–90 minutes while the mixture was cooled down to keep the temperature below 35° C. After addition, the temperature of the mixture was allowed to raise to 40° C. and was kept at 40° C. for 1 hour. Then, the NCO-content was checked.

Without correcting for the midpoint value, the alkyd was added in one portion, and an exotherm to 80° C. was allowed. Finally, IBOA was added, the temperature was allowed to raise to 80° C. and was kept at 80° C. until the NCO-level was lower than 0.1%.

What is claimed is:

1. Radiation-curable composition comprising
   (A) a urethane (meth)acrylate oligomer comprising an alkyd backbone, said alkyd backbone being derived from a polyester, said polyester having pendant ester groups protruding off of a main polymer chain of ester linkages, said pendant ester groups being derived from a compound selected from the group consisting of coconut oil, palm Kernel oil, and hydrogenated varieties of unsaturated oils or fatty acids having an Iodine value below 100 centigrams iodine/gram sample,
   (B) a reactive diluent, and
   (C) a photoinitiator.

2. The radiation-curable composition according to claim 1, wherein the composition, after cure, has a modulus of above 0.50 MPa.

3. The radiation-curable composition of claim 1, wherein said oligomer comprising an alkyd backbone is derived from a solvent-free reaction.

4. The radiation-curable composition of claim 1 wherein said alkyd backbone has an Iodine value of less than about 10 centigrams Iodine/gram sample.

5. The radiation-curable composition of claim 1 wherein the composition is an inner primary coating composition, an outer primary coating composition, a matrix material composition, an ink composition, or a bundling material composition.

6. The radiation-curable composition according to claim 1 wherein the composition is colored.

7. The radiation-curable composition of claim 1, wherein said composition, after cure, has a modulus of 100–1,000 MPa.

8. The radiation-curable composition of claim 1, wherein said composition, after cure, has a modulus of 0.1–10 MPa.

9. The radiation-curable composition of claim 1, wherein said alkyd backbone has a number average molecular weight of 900–3,000.

10. A coated optical fiber with a coating obtained by curing a composition according to claim 1.

11. Coated optical fiber according to claim 10, wherein the optical fiber is a bare optical glass fiber.

12. Coated optical fiber according to claim 10, wherein the optical fiber is an optical glass fiber coated with an inner primary coating.

13. Coated optical fiber according to claim 10, wherein the optical fiber is an optical glass fiber coated with an inner and an outer primary coating.

14. Coated optical fiber according to claim 10, wherein the optical fiber is an optical glass fiber coated with an inner primary coating, an outer primary coating and an ink composition.

15. Radiation-curable composition comprising
(A) a urethane (meth)acrylate oligomer comprising an alkyd backbone, said alkyd backbone derived from a polyfunctional alcohol, a polyfunctional carboxylic acid and said monocarboxylic fatty acid, and wherein the polyfunctional carboxylic acid compound is at least one compound selected from the group consisting of adipic acid, orthophthalic acid, isophthalic acid, and terephthalic acid, and the polyfunctional alcohol compound is at least one compound selected from the group consisting of glycerol, trimethylol propane, trimethylol ethane, pentaerythritol, neopentyl glycol, 2-butyl-2-ethyl-1,3-propanediol, and hydroxypivaloyl hydroxy pivalate, said alkyd backbone having pendant ester groups protruding off of a main polymer chain of ester linkages, said pendant ester groups being derived from long chain monocarboxylic fatty acids having an Iodine value below 100 centigrams iodine/gram sample,
(B) a reactive diluent, and
(C) a photoinitiator.

16. The radiation-curable composition according to claim 15, wherein the composition, after cure, has a modulus of above 0.50 MPa.

17. The radiation-curable composition of claim 15, wherein said oligomer comprising an alkyd backbone is derived from a solvent-free reaction.

18. A coated optical fiber with a coating obtained by curing a composition according to claim 15.

19. Radiation-curable composition comprising
(A) a urethane (meth)acrylate oligomer comprising an alkyd backbone, said alkyd backbone being derived from a naturally derived oil and said alkyd backbone having pendant ester group protruding off of a main polymer chain of ester linkages, said pendant ester groups being derived from a naturally derived oil having an Iodine value below 100 centigrams iodine/gram sample,
(B) a reactive diluent, and
(C) a photoinitiator.

20. The radiation-curable composition according to claim 19, wherein the composition, after cure, has a modulus of above 0.50 MPa.

21. The radiation-curable composition of claim 19, wherein said oligomer comprising an alkyd backbone is derived from a solvent-free reaction.

22. A coated optical fiber with a coating obtained by curing a composition according to claim 19.

23. Radiation-curable composition comprising
(A) a urethane (meth)acrylate oligomer comprising an alkyd backbone, said alkyd backbone being derived from a polyester, said polyester having pendant ester groups protruding off of a main polymer chain of ester linkages, said pendant ester groups being derived from an oil selected from the group consisting of coconut oil, babassu oil, chinese tallow oil, ouri-curl oil, and palm kernel oil having an Iodine value below 100 centigrams iodine/gram sample,
(B) a reactive diluent, and
(C) a photoinitiator.

24. The radiation-curable composition according to claim 23, wherein the composition, after cure, has a modulus of above 0.50 MPa.

25. The radiation-curable composition of claim 23, wherein said oligomer comprising an alkyd backbone is derived from a solvent-free reaction.

26. A coated optical fiber with a coating obtained by curing a composition according to claim 23.

27. Radiation-curable composition comprising
(A) a urethane (meth)acrylate oligomer comprising an alkyd backbone, said alkyd backbone being derived from a polyester derived from a polyol selected from the group consisting of trialcohol alkanes and pentaerythritol, a polyacid, and a monocarboxylic fatty acid; said polyester having pendant ester groups protruding off of a main polymer chain of ester linkages, said pendant ester groups being derived from said monocarboxylic fatty acids having an Iodine value below 100 centigrams iodine/gram sample,
(B) a reactive diluent, and
(C) a photoinitiator.

28. The radiation-curable composition of claim 27, wherein said monocarboxylic fatty acid includes an acid selected from the group consisting of coconut oil, babassu oil, chinese tallow oil, ouri-curl oil, palm kernel oil, caprylic acid, caproic acid, capric acid, coconut fatty acid, lauric acid, myristic acid, palmitic acid, and stearic acid.

29. The radiation-curable composition according to claim 28, wherein the composition, after cure, has a modulus of above 0.50 MPa.

30. The radiation-curable composition of claim 28, wherein said oligomer comprising an alkyd backbone is derived from a solvent-free reaction.

31. The radiation-curable composition according to claim 27, wherein the composition, after cure, has a modulus of above 0.50 MPa.

32. The radiation-curable composition of claim 27, wherein said oligomer comprising an alkyd backbone is derived from a solvent-free reaction.

33. A coated optical fiber with a coating obtained by curing a composition according to claim 27.

34. A cowed optical fiber with a coating obtained by curing a composition according to claim 28.

35. The radiation-curable composition of claim 34, wherein the composition is an inner primary coating composition, an outer primary coating composition, a matrix material composition, an ink composition, or a bundling material composition.

* * * * *